United States Patent
Sozen et al.

(10) Patent No.: US 12,006,060 B2
(45) Date of Patent: Jun. 11, 2024

(54) HUMAN-MACHINE INTERFACE ARCHITECTURE IN AN AIRCRAFT

(71) Applicant: Airbus Operations SAS, Toulouse (FR)

(72) Inventors: Neset Sozen, Toulouse (FR); Marc Vie, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 481 days.

(21) Appl. No.: 17/320,292

(22) Filed: May 14, 2021

(65) Prior Publication Data

US 2021/0354845 A1  Nov. 18, 2021

(30) Foreign Application Priority Data

May 18, 2020  (FR) ........................ 2004940

(51) Int. Cl.

| B64D 43/00 | (2006.01) |
|---|---|
| B64D 45/00 | (2006.01) |
| G06F 9/50 | (2006.01) |
| G06F 9/54 | (2006.01) |

(52) U.S. Cl.
CPC ............. B64D 43/00 (2013.01); B64D 45/00 (2013.01); G06F 9/5027 (2013.01); G06F 9/542 (2013.01); G06F 9/546 (2013.01)

(58) Field of Classification Search
CPC ....... B64D 43/00; B64D 45/00; G06F 9/5027; G06F 9/542; G06F 9/546; G06F 9/451
See application file for complete search history.

(56) References Cited

U.S. PATENT DOCUMENTS

| 10,163,185 B1 | 12/2018 | Yarker et al. |
| 2012/0036445 A1* | 2/2012 | Ganille ................ G06F 9/451 715/738 |
| 2020/0110621 A1 | 4/2020 | Sokomba et al. |

FOREIGN PATENT DOCUMENTS

EP  3633505 A1  4/2020

OTHER PUBLICATIONS

French Search Report; priority document.

* cited by examiner

*Primary Examiner* — Michael J Zanelli
(74) *Attorney, Agent, or Firm* — Greer, Burns & Crain, Ltd.

(57) ABSTRACT

A human-machine interface system enables interactions between aeronautical applications and aircraft control and display instruments. The human-machine interface system comprises an interface server communicating, by virtue of a common core protocol, with the aeronautical applications and control and display managers performing an abstraction of control and display instruments. The human-machine interface comprises application extension libraries providing an implementation of the common core protocol dedicated to each aeronautical application, as well as a display window definition dedicated to each aeronautical application. The human-machine interface comprises at least one control and display utility extension library providing an implementation of the common core protocol dedicated to the control and display managers. Hence, a flexible, portable and reusable architecture with easy extension and scalability opportunities is provided.

7 Claims, 5 Drawing Sheets

HUMAN-MACHINE INTERFACE ARCHITECTURE IN AN AIRCRAFT

CROSS-REFERENCES TO RELATED APPLICATIONS

This application claims the benefit of the French patent application No. 2004940 filed on May 18, 2020, the entire disclosures of which are incorporated herein by way of reference.

FIELD OF THE INVENTION

The technical field of the present invention is that of the human-machine interface in an aircraft. More particularly, the present invention relates to an architecture for linking aeronautical applications to control and display instruments intended for aircraft pilots.

BACKGROUND OF THE INVENTION

In an aircraft, the cockpit comprises a certain number of control and display instruments. Included among these are displays which enable data from aeronautical applications, in particular, flight assistance applications, implemented by servers of the aircraft avionics to be displayed. Consoles also enable the input of commands (e.g., dedicated keys) or character strings (e.g., keyboard), particularly in order to parameterize these applications or to change the screen or context shown on a display. For example, reference can be made to glass cockpits, frequently denoted using the acronym CDS (Cockpit Display System), or also to Multifunctional Control and Display Units denoted using the acronym MCDU, or also to CPDLC (Controller-Pilot Data Link Communications) such as DLCDU (Data Link Control And Display Units).

At the present time, aeronautical applications are dedicated to control and display instruments with which the aeronautical applications interact. Control and display instruments, as well as aeronautical applications, typically differ from one family of aircraft to another, and/or from one aircraft manufacturer to another. This approach involves numerous developments, even though the functions performed are basically identical. Moreover, an addition of new aeronautical application functions and/or new control and display instruments is a complex and costly operation in terms of development, integration and validation.

It is therefore desirable for an architecture to be provided to link aeronautical applications with control and display instruments, which provides greater flexibility, portability and reusability, as well as extension and scalability opportunities.

SUMMARY OF THE INVENTION

To this end, a human-machine interface system is proposed which is configured to enable interactions between aeronautical applications and aircraft control and display instruments via the human-machine interface system and comprises: an interface server in which the aeronautical applications and control and display managers are connected, each control and display manager being associated with a control and display instrument and performing an abstraction of the associated control and display instrument, the interface server communicating with each aeronautical application and each control and display manager using a common core protocol; application extension libraries which are called up by the interface server to obtain an implementation of the common core protocol dedicated to each aeronautical application, as well as a display window definition which is dedicated to each aeronautical application and which has a part which is agnostic to any display technology and another part which is specific to a display technology; and at least one control and display utility extension library which is called up by the interface server to obtain implementation of the common core protocol dedicated to the control and display managers. As a consequence, due to an architecture of this kind, greater flexibility, portability and reusability are offered, as well as extension and scalability opportunities. In fact, when a new aeronautical application has to be supported, interactions with any existing control and display instrument are guaranteed, due to the interface server and the common core protocol. All that is then needed is for an application extension library configured to the data/information produced by this new aeronautical application to be supplied. Likewise, when a new control and display instrument has to be supported, interactions with any existing aeronautical application are also guaranteed due to the interface server and the common core protocol. All that is then needed is for a control and display manager which performs an abstraction configured to the new control and display instrument to be associated. If needed, a control and display utility extension library can also be added if the functioning of this new control and display instrument cannot be modelled on those which already exist.

According to a particular embodiment, the interface server comprises a resource manager, the resources enabling a transition between a domain specific to data handled and supplied by the aeronautical applications and a domain specific to the display, the resources using the display window definitions dedicated to the aeronautical applications to achieve this.

According to a particular embodiment, the interface server comprises a manager of recalls, of first queues dedicated to exchanges with the aeronautical applications and of second queues dedicated to exchanges with the control and display managers, the recall manager being configured to process requests and events received and stored in the first and second queues by calling up the application extension libraries and the at least one control and display utility extension library, in order to update the resources as a consequence, the recall manager being configured to insert display update events in the second queues when the resources are updated, and the recall manager being configured to insert events in the first queues when the resources are updated following the processing of events.

Avionics comprising electronic circuitry which comprises a human-machine interface of this kind in the form of electronic circuitry is also proposed. An aircraft comprising this kind of avionics is also proposed.

A human-machine interface method which is configured to enable interactions between aeronautical applications and aircraft control and display instruments is also proposed, the method being executed by a human-machine interface system comprising: an interface server in which the aeronautical applications and control and display managers are connected, each control and display manager being associated with a control and display instrument and performing an abstraction of the associated control and display instrument; application extension libraries; and at least one control and display utility extension library. The method comprises the following steps performed by the interface server: communication with each aeronautical application and each control and display manager using a common core protocol; calling up the application extension libraries in order to obtain an implementation of the common core protocol dedicated to each aeronautical application, as well as a display window definition which is dedicated to each aeronautical application and which has a part which is agnostic to any display technology and another part which is specific to a display technology; and calling up the at least one control and display utility extension library in order to obtain an implementation of the common core protocol dedicated to the control and display managers. A computer program product comprising instructions implementing a method of this kind when the instructions are executed by a processor is also proposed. An information storage medium storing a computer program product of this kind is also proposed.

BRIEF DESCRIPTION OF THE DRAWINGS

The features of the invention referred to above, as well as others, will become clearer on reading the following description of an exemplary embodiment, the description being provided in relation to the attached drawings, among which.

DETAILED DESCRIPTION OF THE PREFERRED EMBODIMENTS

Figure 1:
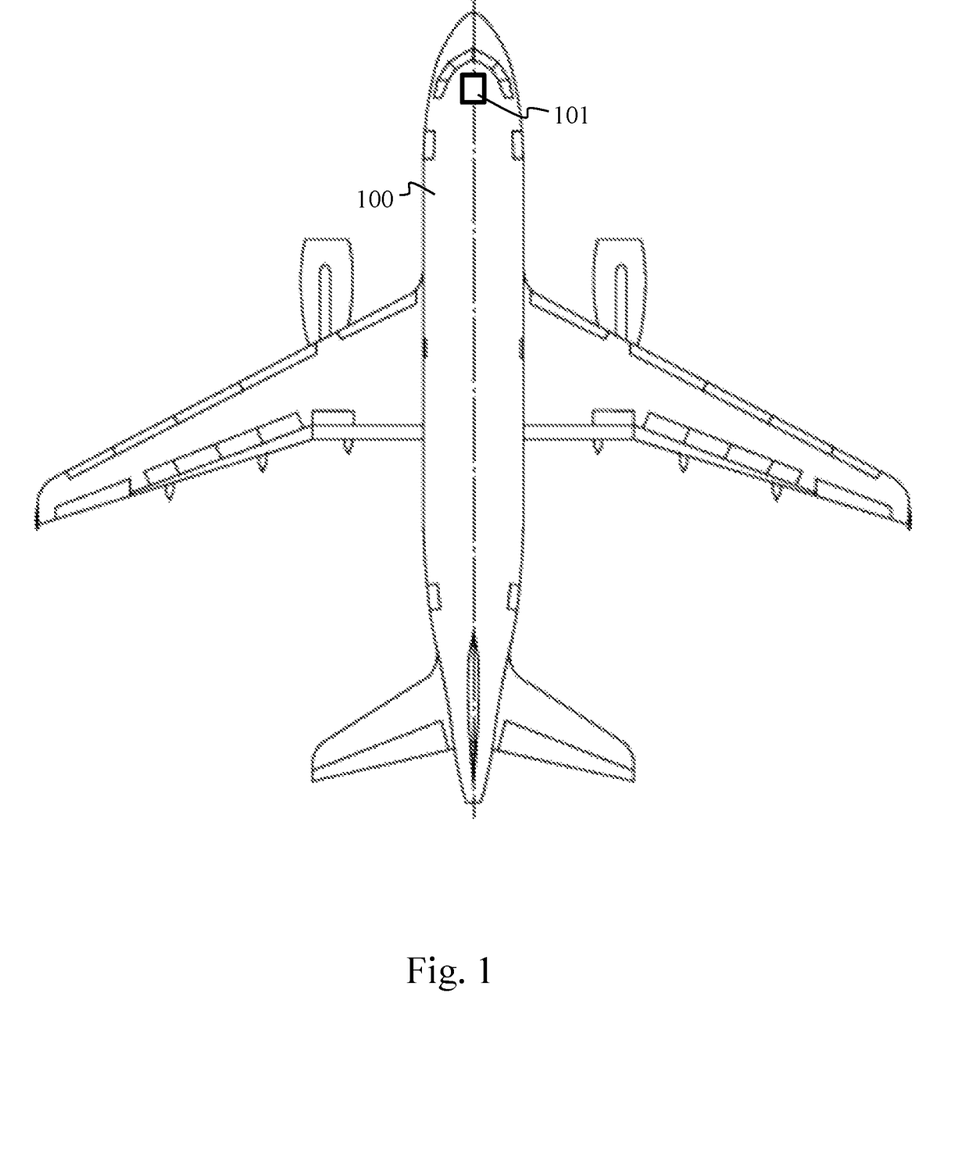
FIG. 1 illustrates schematically, in plan view, an aircraft in which the present invention can be implemented.

FIG. 1 illustrates an aircraft 100 schematically in plan view. The aircraft 100 comprises a cockpit configured to accommodate at least one pilot to operate the aircraft 100. In the cockpit, the pilot or pilots have control and display instruments such as cockpit display systems CDS, multifunctional control and display units MCDU, a controller-pilot data link communications unit CPDLC, or electronic flying bag-type portable equipment EFB, etc. The aircraft 100 is, moreover, equipped with avionic servers 101 implementing aeronautical applications providing assistance to the pilot, or pilots, with operating the aircraft 100. For example, these aeronautical applications relate to flight management or controller-pilot communications.

Figure 2:
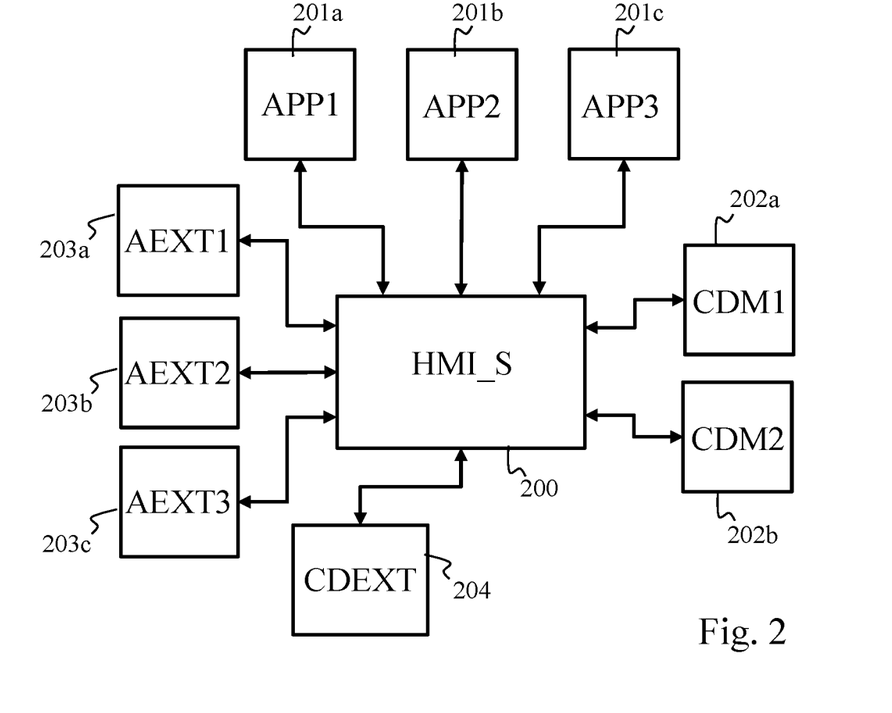
FIG. 2 illustrates schematically a logic arrangement of a human-machine interface system in the aircraft.

In order to guarantee the interactions between the aeronautical applications and the control and display instruments, the aircraft 100 comprises a human-machine interface system, a logic arrangement of which is schematically illustrated in FIG. 2.

The human-machine interface system comprises an interface server HMI_S 200 configured to enable aeronautical applications to interact with control and display instruments of the aircraft 100. Three aeronautical applications APP1 201a, APP2 201b, APP3 201c are represented by way of illustration in FIG. 2. Each control and display instrument is fitted, either integrally or connected externally (see FIG. 3 below), with a control and display manager CDM. Two control and display managers CDM1 202a, CDM2 202b are represented by way of illustration in FIG. 2. Each aeronautical application and each control and display manager CDM are connected to the interface server HMI_S 200 and are clients of abstraction functions of the interface server HMI_S 200. To achieve this, each aeronautical application and each control and display manager CDM communicate with the interface server HMI_S 200 using a common core protocol; in this way messages in the same format are exchanged between the aeronautical applications APP1 201a, APP2 201b, APP3 201c and the interface server HMI_S 200 and between the interface server HMI_S 200 and the control and display managers CDM1 202a, CDM2 202b. Typically, these messages are requests, possibly response follow-ups, and events, possibly also response follow-ups (e.g., error code transmission, where appropriate).

According to one embodiment, each message from the core protocol follows a common format comprising a client identification field ClientID (which identifies the client concerned), a length field L (which indicates the length of the message), an operation code field OpCode and a payload data field PLD which depend on the value of the operation code field OpCode. Other fields may be predefined in the common format.

The aeronautical applications APP1 201a, APP2 201b, APP3 201c produce data, such as flight data (e.g., altitude), for example, or more generally information, such as alarms, for example, to be displayed on one or more of the control and display instruments. The aeronautical applications are not in charge of the way in which this information is actually provided to the pilot, or pilots, of the aircraft 100.

The human-machine interface system moreover comprises application extension libraries, each of them being associated with an aeronautical application. In this respect, FIG. 2 depicts by way of illustration three application extension libraries AEXT1 203a, AEXT2 203b, AEXT3 203c. The application extension libraries AEXT1 203a, AEXT2 203b, AEXT3 203c define the detail of the exchange protocol between the interface server HMI_S 200 and the respective aeronautical applications APP1 201a, APP2 201b, APP3 201c, in particular, the different operation codes OpCode that can be used, every data structure applicable to each operation code OpCode, including in it the definition of requests (data supply or information update, generation of alarm signal . . . ) and events (user information input . . . ). The application extension libraries AEXT1 203a, AEXT2 203b, AEXT3 203c moreover provide an implementation of the exchange protocol between the interface server HMI_S 200 and the respective aeronautical applications APP1 201a, APP2 201b, APP3 201c, in other words, the behavior of the interface server HMI_S 200 in exchanges with the respective aeronautical applications APP1 201a, APP2 201b, APP3 201c in processing requests, generating events and any responses to requests . . . . Moreover, the application extension libraries AEXT1 203a, AEXT2 203b, AEXT3 203c contextualize the display of data and information produced by their respective aeronautical applications APP1 201a, APP2 201b, APP3 201c.

The control and display managers CDM1 202a, CDM2 202b are abstraction modules of the control and display instruments and are thereby used to carry out a conversion between messages exchanged with the interface server HMI_S 200 and actual interaction instructions or signals with the control and display instruments. The control and display managers CDM1 202*a*, CDM2 202*b* thereby enable interaction with any type of control and display instrument by being based on the format of the core protocol.

The human-machine interface system further comprises at least one control and display utility extension library CDEXT 204. The human-machine interface system preferably comprises a unique control and display utility extension library CDEXT 204, since the interactions with the different control and display instruments are similar (pressing a button, requesting a display update . . . ). The control and display utility extension library CDEXT 204 defines the detail of the exchange protocol between the interface server HMI_S 200 and the control and display managers CDM1 202*a*, CDM2 202*b*, in particular, the different operation codes OpCode that can be used, every data structure applicable to each operation code OpCode, including in it the definition of requests (display request, update request or display refresh request . . . ) and events (character input, pressing a button or an icon, dial adjustment . . . ). The control and display utility extension library CDEXT 204 further provides an implementation of the exchange protocol between the interface server HMI_S 200 and the control and display managers CDM1 202*a*, CDM2 202*b*, in other words the behavior or the interface server HMI_S 200 in exchanges with the control and display managers CDM1 202*a*, CDM2 202*b* in generating requests, processing events . . . .

This kind of architecture of the human-machine interface system enables there to be a separation between the functions which concern the domain of the data/information itself and the functions which concern the display domain. Details of this aspect are provided below in relation to FIG. 4.

Figure 3:
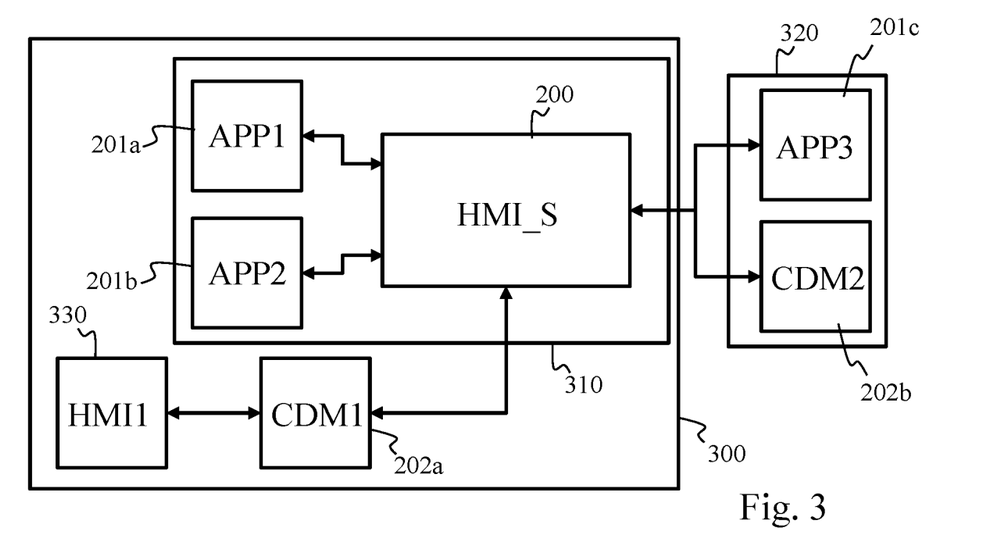
FIG. 3 illustrates schematically an exemplary hardware arrangement of the human-machine interface system.

FIG. 3 illustrates schematically an exemplary hardware arrangement of the human-machine interface system focusing on the possible locations of the aeronautical applications APP1 201*a*, APP2 201*b*, APP3 201*c* and of the control and display managers CDM1 202*a*, CDM2 202*b*.

The interface server HMI_S 200 is implemented by electronic circuitry 310. For example, as illustrated in FIG. 3, the electronic circuitry 310 is electronic circuitry of the avionics 300 of the aircraft 100 which also implements the aeronautical applications APP1 201*a*, APP2 201*b*. The electronic circuitry 310 is, for example, a server device or a collection of server devices. The control and display manager CDM1 202*a* is also implemented by an electronic circuitry of the avionics 300. The control and display manager CDM1 202*a* is connected via a set of inputs/outputs to a control and display instrument HMI1 330, such as a multifunctional control and display unit MCDU. The control and display manager CDM2 202*b* and the aeronautical application APP3 201*c* are embedded in an electronic flying bag EFB 320.

For example, in the arrangement in FIG. 3, the aeronautical application APP1 201*a* generates data/information which are displayed by the control and display instrument HMI1 330 via the control and display manager CDM1 202*a*, the aeronautical application APP2 201*b* generates data/information which is displayed by the electronic flying bag EFB 320 via the control and display manager CDM2 202*b*. The aeronautical application APP3 201*c* generates data/information which is displayed by the electronic flying bag EFB 320 via the control and display manager CDM2 202*b*. The data/information generated by the aeronautical application APP3 201*c* may also be displayed by the control and display instrument HMI1 330 via the control and display manager CDM1 202*a*.

The application extension libraries AEXT1 203*a*, AEXT2 203*b*, AEXT3 203*c*, as well as the at least one control and display utilities extension library CDEXT 204, are also implemented by the electronic circuitry of the avionics 300, for example by the electronic circuitry 310.

FIG. 3 thereby shows that the proposed architecture offers great flexibility in terms of implementation.

Figure 4:
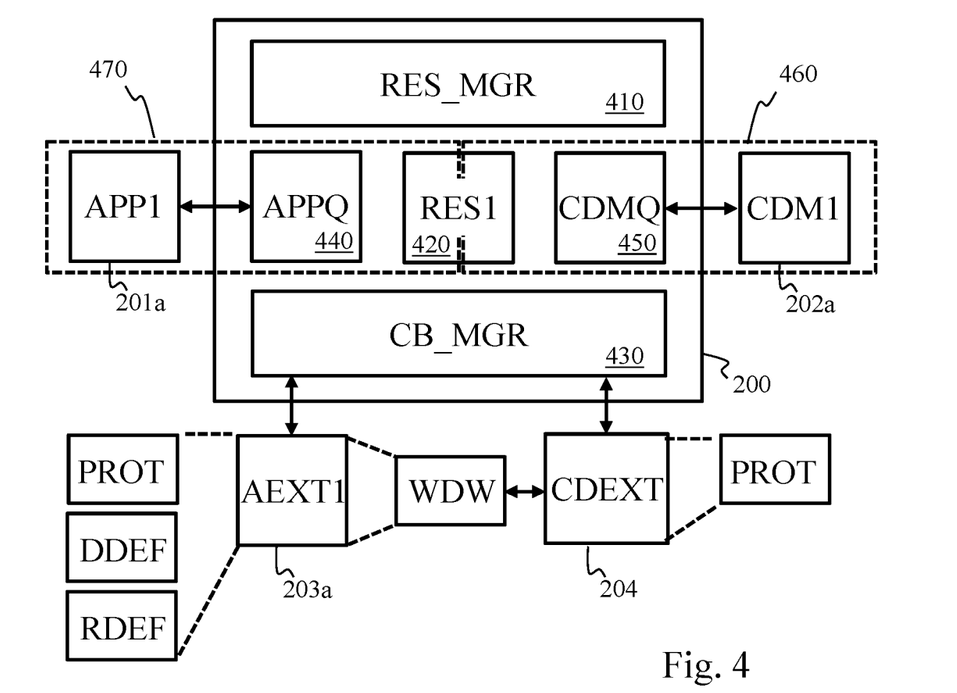
FIG. 4 illustrates schematically a functional arrangement of the human-machine interface system.

FIG. 4 illustrates schematically a functional arrangement of the human-machine interface system. FIG. 4 illustrates, more particularly, an arrangement of the interface server HMI_S 200 in the context of a linkage between the aeronautical application APP1 201*a* and the control and display manager CDM1 202*a*.

The interface server HMI_S 200 comprises first queues APPQ 440 dedicated to exchanges with the aeronautical applications APP1 201*a*, APP2 201*b*, APP3 201*c*. The first queues APPQ 440 are configured to store messages temporarily which are formatted using the common core protocol and exchanged with the aeronautical applications APP1 201*a*, APP2 201*b*, APP3 201*c*. The first queues APPQ 440 preferably include a transmission queue and a reception queue for each aeronautical application.

The interface server HMI_S 200 comprises second queues CDMQ 450 dedicated to exchanges with the control and display managers CDM1 202*a*, CDM2 202*b*. The second queues CDMQ 450 are configured for the temporary storage of messages which are formatted according to the common core protocol and exchanged with the control and display managers CDM1 202*a*, CDM2 202*b*. The second queues CDMQ 450 preferably include a transmission queue and a reception queue for each control and display manager CDM.

The interface server HMI_S 200 comprises a callback manager CB_MGR 430 in charge of executing a main process of the interface server HMI_S 200.

The principal process is in charge of processing messages received in the first queues APPQ 440 and, as a result, making calls to the application extension libraries AEXT1 203*a*, AEXT2 203*b*, AEXT3 203*c*. As has already been mentioned, the application extension libraries AEXT1 203*a*, AEXT2 203*b*, AEXT3 203*c* provide a definition and an implementation (labelled PROT in FIG. 4) of the exchange protocol between the interface server HMI_S 200 and the respective aeronautical applications APP1 201*a*, APP2 201*b*, APP3 201*c*. The application extension libraries AEXT1 203*a*, AEXT2 203*b*, AEXT3 203*c* also provide a definition (labelled DREF in FIG. 4) of the data/information structures potentially supplied by the respective aeronautical applications APP1 201*a*, APP2 201*b*, APP3 201*c*.

The principal process is also in charge of processing the messages received in the second queues CDMQ 450 and, as a result, of making calls to the at least one control and display utility extension library CDEXT 204. As has already been mentioned, the at least one control and display utility extension library CDEXT 204 provides a definition and an implementation (labelled PROT in FIG. 4) of the exchange protocol between the interface server HMI_S 200 and the control and display managers CDM1 202*a*, CDM2 202*b*.

The principal process is also in charge of guaranteeing display updates with control and display managers CDM1 202*a*, CDM2 202*b* due to display window definitions (labelled WDW in FIG. 4), which are provided by the application extension libraries AEXT1 203*a*, AEXT2 203*b*, AEXT3 203*c*. The definitions of display windows WDW have a part which is agnostic to any display technology and a part which is specific to the display. This enables flexibility to be provided for a potential evolution through the addition of a new control and display instrument, since only the part specific to the display then has to be configured, the rest being capable of being reused by a previous design. For the part specific to the display, the definitions of display windows are preferably classed by context, pages, entities and atomic elements (e.g., widgets). The atomic elements are the smallest elements that can be displayed. One or multiple entities are displayed on a same page and they each comprise one or multiple atomic elements. A context is made up of one or multiple pages associated with a same display subject, for example by being equivalent to user application page layers (UAPL), sometimes also referred to using the simplified acronym UAL standing for User Application Layers, of the standard ARINC 661.

The principal process is also in charge of ensuring transmissions of messages (e.g., events, replies) stored in the first queues APPQ 440 for the attention of the aeronautical applications APP1 201a, APP2 201b, APP3 201c and transmissions of messages (e.g., for display updating) stored in the second queues CDMQ 450 for the attention of the control and display managers CDM1 202a, CDM2 202b.

Some examples of executions performed by the principal process are presented below in relation to FIGS. 6 and 7.

In this way, the proposed architecture makes a transition between a domain 470 specific to data/information, such as that handled and supplied by the aeronautical applications APP1 201a, APP2 201b, APP3 201c, and a domain 460 specific to the display. In order to manage this transition, the interface server HMI_S 200 implements resources managed by a resource manager RES_MGR 410 which use the definitions of display windows WDW in order to create a link between the domain 470 specific to data/information, such as that handled and supplied by the aeronautical applications APP1 201a, APP2 201b, APP3 201c, and the domain 460 specific to the display. For example, in FIG. 4 a resource RES1 420 makes the transition between the domain 470 of the data of the aeronautical application APP1 210a and the domain 460 of the data of the control and display manager CDM1 202a. Each resource defines a type of data involved (character string, integer, date . . . ) and also defines whether the updating of the resource is achievable from the domain 460 (e.g., user input) or from the domain 470 (data pushed by the aeronautical application involved). When the aeronautical application APP1 201a pushes a data update, the resource RES1 420 is updated as a result by writing via the domain 470 and the display of this data by the control and display manager CDM1 202a is updated via the domain 460 by reading this resource RES1 420. Transitions from the domain 460 to the domain 470 are also possible via the resource RES1 420, for example when a character input is performed via the control and display instrument managed by the control and display instrument CDM1 202a.

Figure 5:
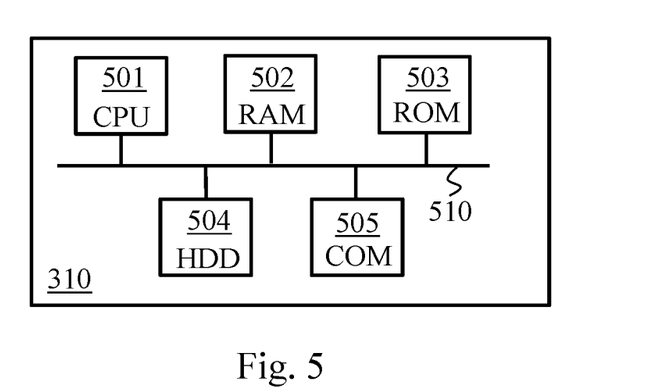
FIG. 5 illustrates schematically a hardware arrangement of electronic circuitry of the human-machine interface system.

FIG. 5 illustrates schematically a hardware arrangement of electronic circuitry of the human-machine interface system, such as the electronic circuitry 310, for example.

The electronic circuitry in question therefore comprises, linked by a communications bus 510: a processor or CPU (Central Processing Unit) 501; a RAM (Random-Access Memory) 502; a ROM (Read-Only Memory) or EEPROM (Electrically-Erasable Programmable ROM) 503; a storage unit 504, such as an HDD (Hard Disk Drive), or a memory card reader, such as an SD (Secure Digital) memory card; an input/output manager or communication interface manager COM 505.

The processor 501 is capable of executing instructions loaded onto the random-access memory 502 from the read-only memory 303, from an external memory, from a memory card (such as an SD card) or from a communication network. When voltage is applied to the electronic circuitry, the processor 501 is capable of reading instructions from the random-access memory 502 and executing them. These instructions form a computer program causing implementation by the processor 501 of all, or some, of the modules, steps and operations described here in relation to the electronic circuitry.

All or some of the modules, steps and operations described here in relation to the electronic circuitry can thus be implemented in software form through the execution of a set of instructions by a programmable machine, for example a DSP (Digital Signal Processor) or a processor, or they can be implemented in hardware form by a machine or dedicated chip, for example an FPGA (Field Programmable Gate Array) or ASIC (Application-Specific Integrated Circuit) chip.

It should be noted that the aeronautical applications APP, the interface server HMI_S and the control and display managers CDM can be deployed on separate machines, or on the same machine, without structural modification of the architecture presented in FIG. 2.

Figure 6:
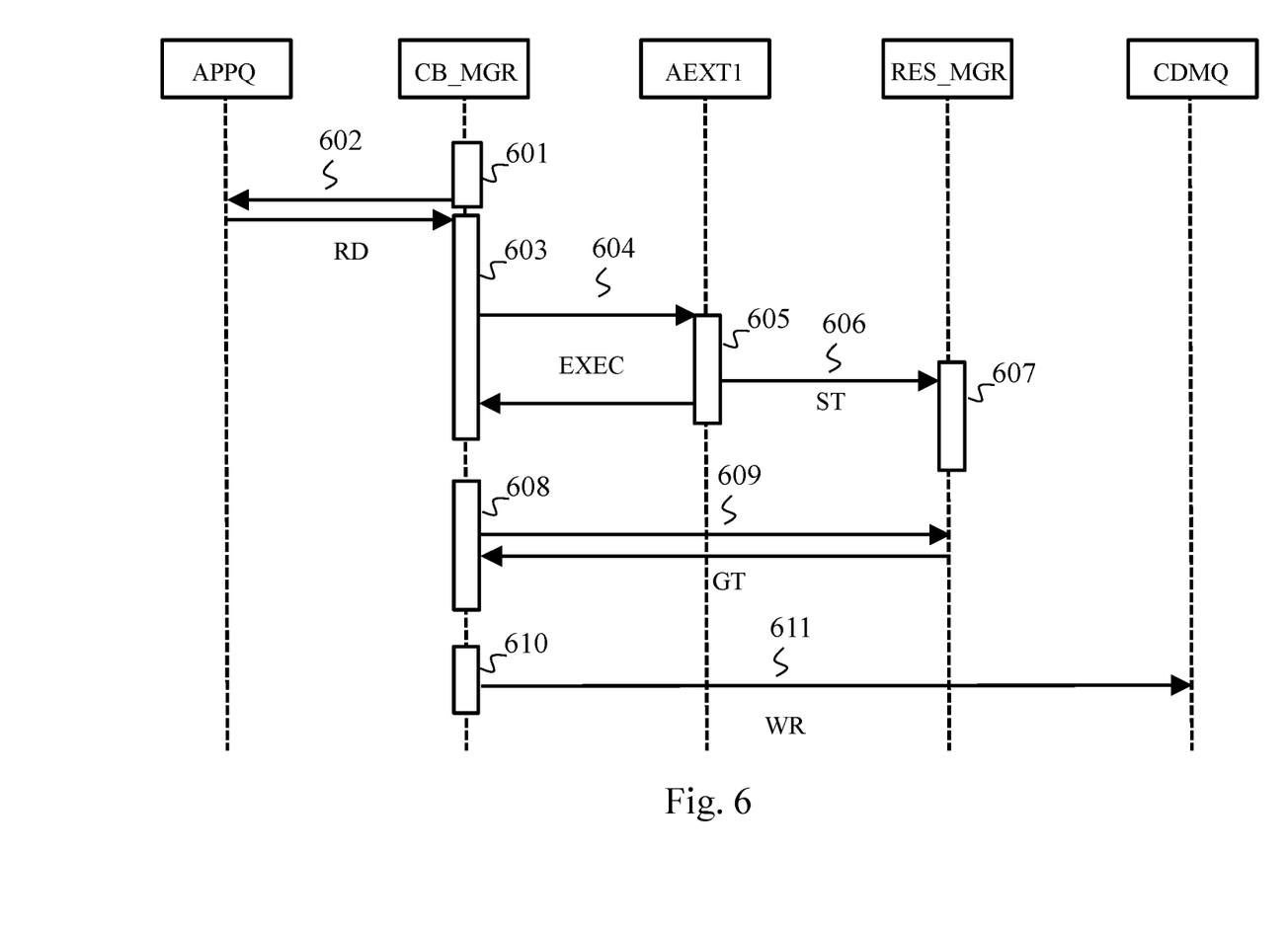
FIG. 6 illustrates schematically a first example of exchanges taking place in the human-machine interface system.

FIG. 6 illustrates schematically a first example of exchanges taking place in the human-machine interface system.

In a step 601, the callback manager CB_MGR 430 checks whether the messages are stored waiting in the first queues APPQ 440 coming from aeronautical applications APP1 201a, APP2 201b, APP3 201c. If this is the case, the callback manager CB_MGR 430 has read-only access (RD in FIG. 6) to the first queues APPQ 440 in a step 602. A priority management can be put in place in the processing order of the messages waiting in the first queues APPQ 440. Let us consider, by way of illustration, that the callback manager CB_MGR 430 obtains a request submitted by the aeronautical application APP1 201a and for which the aeronautical application APP1 201 has supplied an update of data to be displayed.

In a step 603, the callback manager CB_MGR 430 processes the request obtained at step 602. The callback manager CB_MGR 430 launches an execution (EXEC in FIG. 6) of processing corresponding to the operation code OpCode contained in the request by accessing the application extension library AEXT1 203a associated with the aeronautical application APP1 201a in a step 604. In a step 605, the processing defined by the protocol implementation of the application extension library AEXT1 203a is carried out. During this processing, in a step 606, an updating instruction (ST in FIG. 6) of the resource RES1 in accordance with the request submitted by the aeronautical application APP1 201a is transmitted to the resource manager RES_MGR 410, which carries out the update in a step 607.

In a step 608, the callback manager CB_MGR 430 checks whether a display update has to be carried out. With the resource RES1 having been updated following the request submitted by the aeronautical application APP1 201a, the callback manager CB_MGR 430 obtains (GT in FIG. 6), in a step 609, the new value of the corresponding data by virtue of the resource manager RES_MGR 410, with the display window definition defined by the application extension library AEXT1 203a.

In a step 610, the callback manager CB_MGR 430 generates an event intended for the control and display manager CDM1 202a to take account of the display update. Then, in a step 611, the callback manager CB_MGR 430 has writing access (WR in FIG. 6) to the second queues CDMQ 450, in order to store the respective event there. The event is then transmitted by the callback manager CB_MGR 430 to the control and display manager CDM1 202a as soon as any messages which are already stored in the second queues CDMQ 450 have themselves been transmitted. Nevertheless, priority management can be put in place in the order of transmission of messages waiting in the second queues CDMQ 450.

Figure 7:
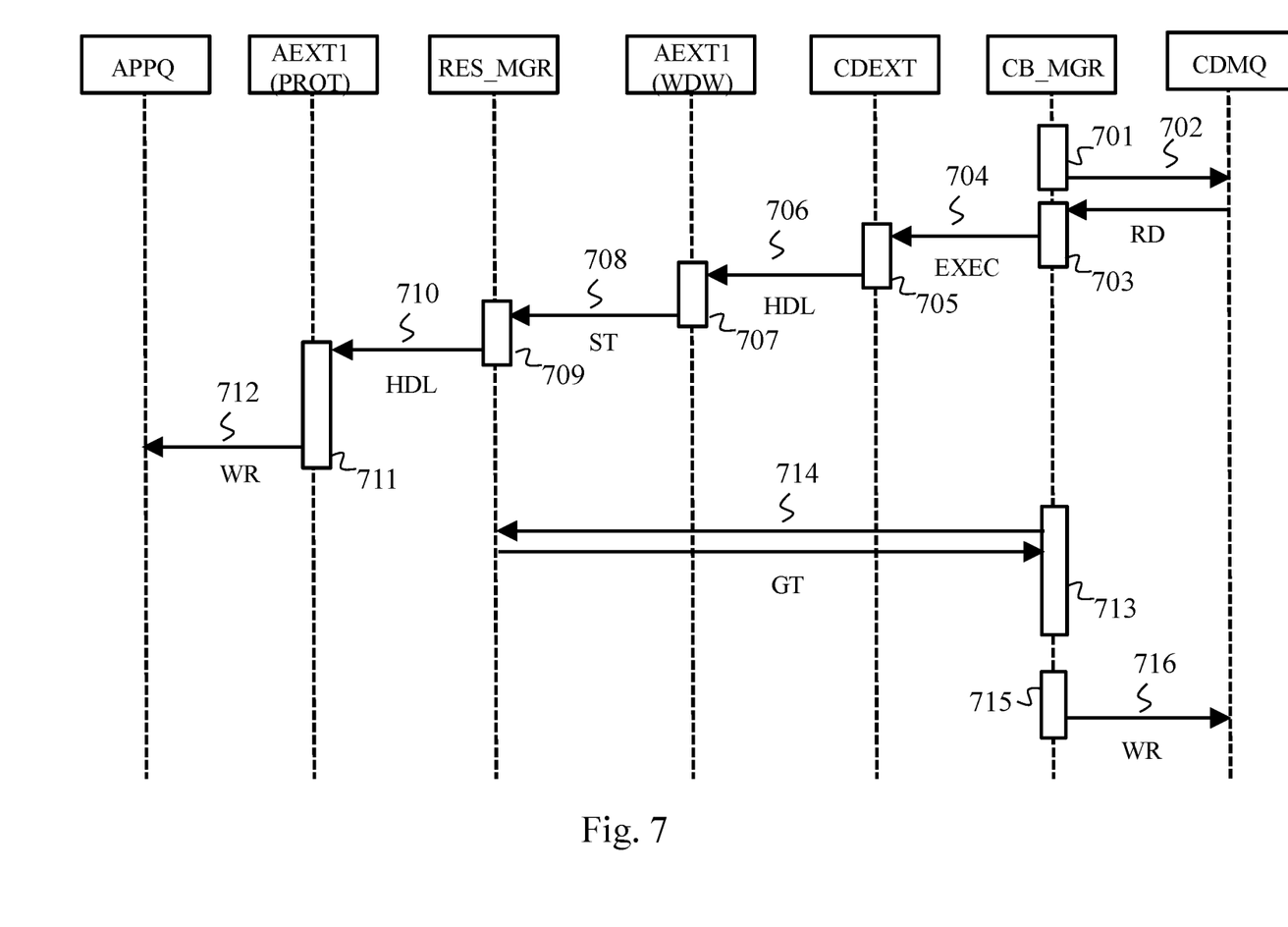
FIG. 7 illustrates schematically a second example of exchanges taking place in the human-machine interface system.

FIG. 7 illustrates schematically a second example of exchanges taking place in the human-machine interface system.

In a step 701, the callback manager CB_MGR 430 checks whether messages are stored waiting in the second queues CDMQ 450 which come from the control and display managers CDM1 202a, CDM2 202b. If this is the case, the callback manager CB_MGR 430 gains read-only access (RD in FIG. 7) to the second queues CDMQ 450 in a step 702. A priority management can be put in place in the processing order of the messages waiting in the second queues CDMQ 450. Let us consider, by way of illustration, that the callback manager CB_MGR 430 obtains an event submitted by the control and display manager CDM1 202a for which the control and display manager CDM1 202a supplies a user input which is to be taken into account.

In a step 703, the callback manager CB_MGR 430 processes the event obtained at step 702. The callback manager CB_MGR 430 launches an execution (EXEC in FIG. 7) of processing corresponding to the operation code OpCode contained in the request, by accessing at a step 704 the at least one control and display utility extension library CDEXT 204. In a step 705, the processing defined by the protocol implementation of the at least one control and display utility extension library CDEXT 204 is carried out. During this processing, in a step 706, a handler (HDL in FIG. 7) of events which is attached to the display windows definition (WDW) of the application extension library AEXT1 203a is called. This event handler is executed in a step 707, over the course of which an updating instruction (ST in FIG. 7) of the resource RES1 in accordance with the event submitted by the control and display manager CDM1 202a is transmitted, in a step 708, to the resource manager RES_MGR 410, which carries out the update in a step 709.

The updating of the resource RES1 from the domain 460 must be notified to the aeronautical application APP1 201a. To achieve this, in a step 710, the resource manager RES_MGR 410 calls an event handler (HDL in FIG. 7) which is attached to the protocol implantation of the application extension library AEXT1 203a. This event handler generates, in a step 711, an event intended for the aeronautical application APP1 201a to take account of the input of characters submitted by the control and display manager CDM1 202a. Then, in a step 712, this event handler gains writing access (WR in FIG. 7) to the first queues APPQ 440 to store the respective event there.

In a step 713, the callback manager CB_MGR 430 checks whether a display update needs to be carried out. With the resource RES1 having been updated following the event submitted by the control and display manager CDM1 202a, the callback manager CB_MGR 430 obtains (GT in FIG. 7), in a step 714, the display update relating to the character input. The display update is obtained by virtue of the resource manager RES_MGR 410, with the display window definition defined by the application extension library AEXT1 203a.

In a step 715, the callback manager CB_MGR 430 generates an event intended for the control and display manager CDM1 202a to take account of the display update. Then, in a step 716, the callback manager CB_MGR 430 gains writing access (WR in FIG. 7) to the second queues CDMQ 450 to store the respective event there. The event is then transmitted by the callback manager CB_MGR 430 to the control and display manager CDM1 202a as soon as any messages already stored in the second queues CDMQ 450 have themselves been transmitted. Here again, a priority management may, however, be put in place in the order of transmission of the messages waiting in the second queues CDMQ 450.

Hence, due to the architecture and operations presented above, when a new aeronautical application has to be supported, interactions with any existing control and display instrument are guaranteed due to the interface server HMI_S 200 and the common core protocol. All that is then required is for an application extension library to be supplied which is configured to the data/information produced by this new aeronautical application. Likewise, when a new control and display instrument has to be supported, interactions with any existing aeronautical application are also guaranteed, due to the interface server HMI_S 200 and the common core protocol. It is then sufficient to associate a control and display manager CDM which carries out an abstraction configured to the new display and control instrument. The proposed architecture thereby offers flexibility, portability and reusability, as well as easy extension and scalability opportunities.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A human-machine interface system configured to enable interactions between aeronautical applications and aircraft control and display instruments via the human-machine interface system, comprising:
   an interface server in which the aeronautical applications and control and display managers are connected, each control and display manager being associated with a control and display instrument and performing an abstraction of the associated control and display instrument, the interface server communicating with each aeronautical application and each control and display manager using a common core protocol;
   application extension libraries which are called up by the interface server to obtain an implementation of the common core protocol dedicated to each aeronautical application, as well as a display window definition which is dedicated to each aeronautical application and which has a part which is agnostic to any display technology and another part which is specific to a display technology; and
   at least one control and display utility extension library which is called up by the interface server to obtain implementation of the common core protocol dedicated to the control and display managers.

2. The human-machine interface system according to claim 1, wherein the interface server comprises a resource manager managing resources, enabling a transition between a domain specific to data handled and supplied by the aeronautical applications and a domain specific to the display, said resources using the display window definitions dedicated to the aeronautical applications to achieve the transition.

3. The human-machine interface system according to claim 2, wherein the interface server comprises a manager of recalls, of first queues dedicated to exchanges with the aeronautical applications and of second queues dedicated to exchanges with the control and display managers, the recall manager being configured to process requests and events received and stored in the first and second queues by calling up the application extension libraries and said at least one control and display utility extension library, in order to update said resources as a consequence, the recall manager being configured to insert display update events in the second queues when said resources are updated, and the recall manager being configured to insert events in the first queues when said resources are updated following the processing of events.

4. Avionics comprising electronic circuitry which comprises the human-machine interface system according to claim 1 formed as electronic circuitry.

5. An aircraft comprising avionics according to claim 4.

6. A human-machine interface method configured to enable interactions between aeronautical applications and aircraft control and display instruments, said method being executed by a human-machine interface system comprising:
- an interface server in which the aeronautical applications and control and display managers are connected, each control and display manager being associated with a control and display instrument and performing an abstraction of the associated control and display instrument;
- application extension libraries; and
- at least one control and display utility extension library, the method comprising the following steps performed by the interface server:
    - communicating with each aeronautical application and each control and display manager using a common core protocol;
- calling up the application extension libraries in order to obtain an implementation of the common core protocol dedicated to each aeronautical application, as well as a display window definition which is dedicated to each aeronautical application and which has a part which is agnostic to any display technology and another part which is specific to a display technology; and
- calling up said at least one control and display utility extension library in order to obtain an implementation of the common core protocol dedicated to the control and display managers.

7. A non-transitory information storage medium storing a computer program product, which when executed by a processor, implements the method according to claim 6.

* * * * *